(12) United States Patent
Rose

(10) Patent No.: US 6,662,169 B2
(45) Date of Patent: Dec. 9, 2003

(54) CONTROLLING THE SELF LEARNING BEHAVIOR OF AN AUTONOMOUS AGENT

(76) Inventor: Ralph E. Rose, 1324 S. Winchester Blvd., #38, San Jose, CA (US) 95128

( * ) Notice: Subject to any disclaimer, the term of this patent is extended or adjusted under 35 U.S.C. 154(b) by 389 days.

(21) Appl. No.: 09/834,786

(22) Filed: Apr. 12, 2001

(65) Prior Publication Data

US 2002/0198853 A1 Dec. 26, 2002

(51) Int. Cl.[7] .............................................. G06F 15/18
(52) U.S. Cl. ........................................ 706/16; 706/12
(58) Field of Search .................................. 706/16, 12

(56) References Cited

U.S. PATENT DOCUMENTS 6,415,274 B1 * 7/2002 Goldsmith ................... 706/45

OTHER PUBLICATIONS

Sawaragi et al, "Decision–Theoretic Selection of Reasoning Scheme for an Autonomous Robot Under Resource Constrains" IEEE Proceedings of International Conference on Intelligent Robots and Systems, Jul. 1993.*

* cited by examiner

*Primary Examiner*—George B. Davis
(74) *Attorney, Agent, or Firm*—Townsend and Townsend and Crew LLP; Kenneth R. Allen

(57) ABSTRACT

In a computer system functioning as an autonomous agent with a robotic controller wherein the computer system need not be programmed to perform a specific task, values in an array of error variables are obtained from comparison between an array of resources variables used to indicate resource use and state of an Autonomous Agent and an array of corresponding desired levels for the resource variables. Each individual value in the array of error variables represents an error in the actual value of a particular resource variable as compared to its desired value. Derivative variables for the resource variables and for parameters controlling behavior of the Autonomous Agent are created. The values of the array of error variables and their associated derivative variables are used to adjust values of the behavior-controlling parameters thereby modifying behavior of the Autonomous Agent.

5 Claims, 5 Drawing Sheets

US 6,662,169 B2

CONTROLLING THE SELF LEARNING BEHAVIOR OF AN AUTONOMOUS AGENT

BACKGROUND OF INVENTION

The present invention relates to machine learning and more particularly to training and optimization of autonomous agents embodied in a computer system.

Resource variables are known for use in measuring the use of available resources and in gauging the state of an autonomous agent. However, the art has not been well developed to make use of resource variables, so that the autonomous agent can be trained and become a self learning machine. It has long been recognized that modifying system parameters can change the behavior of a system so it more closely approximates a desired behavior. The inventor has previously developed training processes making use of derivative variables to determine changes in system parameters. The author proposes the use derivative variables of resources variables as a means of training the autonomous agent. The derivative variables of the resource variables along with error in the level of the resource variables will be the mechanism of directing the behavior of the autonomous agent.

A particularly-related patent from the present inventor is U.S. Pat. No. 5,974,434 issued Oct. 26, 1999, entitled "Method & Apparatus for Automatically Tuning the Parameters of a Feedback Control System." A patent application of the inventor expanding on the earlier work which is related to the present invention is co-pending U.S. patent application Ser. No. 09/692,950 filed Oct. 20, 2000, entitled "Auto-Tuning Method in a Multiple Input Multiple Output Control System". This application also refers to other inventions of the present inventor which are peripherally related to the present invention. This patent and this patent application are incorporated herein by reference for all purposes. None of the prior work of the inventor, whether or not considered to be prior art, address and solve the problem of training an autonomous agent.

SUMMARY OF THE INVENTION

In a computer system functioning as an autonomous agent with a robotic controller wherein the computer system need not be programmed to perform a specific task, values in an array of error variables are obtained from comparison between 1) an array of resources variables used to indicate resource use and state of an Autonomous Agent and 2) an array of corresponding desired levels for the resource variables are used with the array of actual level of resource variables to produce an array of error variables, and 3) the value of the array of error variables are used with the derivative variables of the resources variables to adjust the parameters in Autonomous Agent so as to minimize the value of the error variables and by so doing train the system. Each individual variable in the array of error variables represents an error in the actual value of a particular resource variable as compared to its desired value. Derivative variables for the resource variables and for the parameters controlling behavior of the Autonomous Agent are created according to the invention for use in the training algorithm.

This patent application discloses that the autotuning algorithm which was previously employed with both a linear system and a nonlinear system to train a process controller can be used to direct the self-learning behavior of an autonomous agent, thus providing a form of self-programming. The objective of the self-programming algorithm of Autonomous Agent is to maintain the resource variables within nominal ranges. The auto-tuning algorithm used on the control system can also be used by the Autonomous Agent to direct its learning behavior and improve its performance.

A critical component of this system is a model of the external environment. This model of the external environment, or External System Model, is basically the template used for the generation of the derivative variables used for training. This External System Model is also an adaptive component whose performance will also be evaluated and have its internal component and parameters adjusted to improve its own performance. The program of the Autonomous Agent can then act on its environment and experiment and improve its own performance based upon an evaluation of the experimental results. A benefit in use of this technique is an increase in its adaptability.

The invention will be better understood by reference to the following detailed description of the invention in connection with the accompanying drawings.

DESCRIPTION OF THE SPECIFIC EMBODIMENTS

The purpose of this discussion is to explain how a computer system can be constructed that is self-motivated to learn and adapt to its environment. The motivation for the system to learn is typically a result of a desire to maintain internal variables within an acceptable range. This learning system can be distorted so the system can be trained to serve other objectives of the designer or the operator. By constructing into the system an analog input to inform the system how well it is doing, or the degree of operator satisfaction about the acceptability of its behavior, the system can be trained to behave appropriately. It can also be trained to accept sensory input and to use sensory input as a means of predicting the acceptability of its behavior. With appropriate memory, the system can remember predicted rewards for the appropriateness and acceptability of its behavior so that future rewards can be nothing more than a confirmation of prediction.

The system can also be designed to monitor internal resources and be motivated to keep these variables within an acceptable range. This creates the possibility of producing a "lazy" computer, one that is no longer motivated to do the job on demand, but to do the job in the most effective manner and only if a limited amount of resource will be used.

The idea of using the auto-tuning algorithm as a means of controlling the self learning behavior of the Autonomous Agent was first developed when the Control System for the Autonomous Agent is a State Machine Module. This structure will be explained before alternate designs of the Control System are explored. The objective will not primarily be to explain how a State Machine Module can be used as a Control System within an Autonomous Agent, but how the auto-tuning algorithm can be used as a mechanism to control its learning behavior. Although the internal structure of the Control System within the Autonomous Agent may not be that of a State Machine Module, it will function as if it was. As a result, the mechanism for its analysis can remain the same.

System Controller

Figure 1:
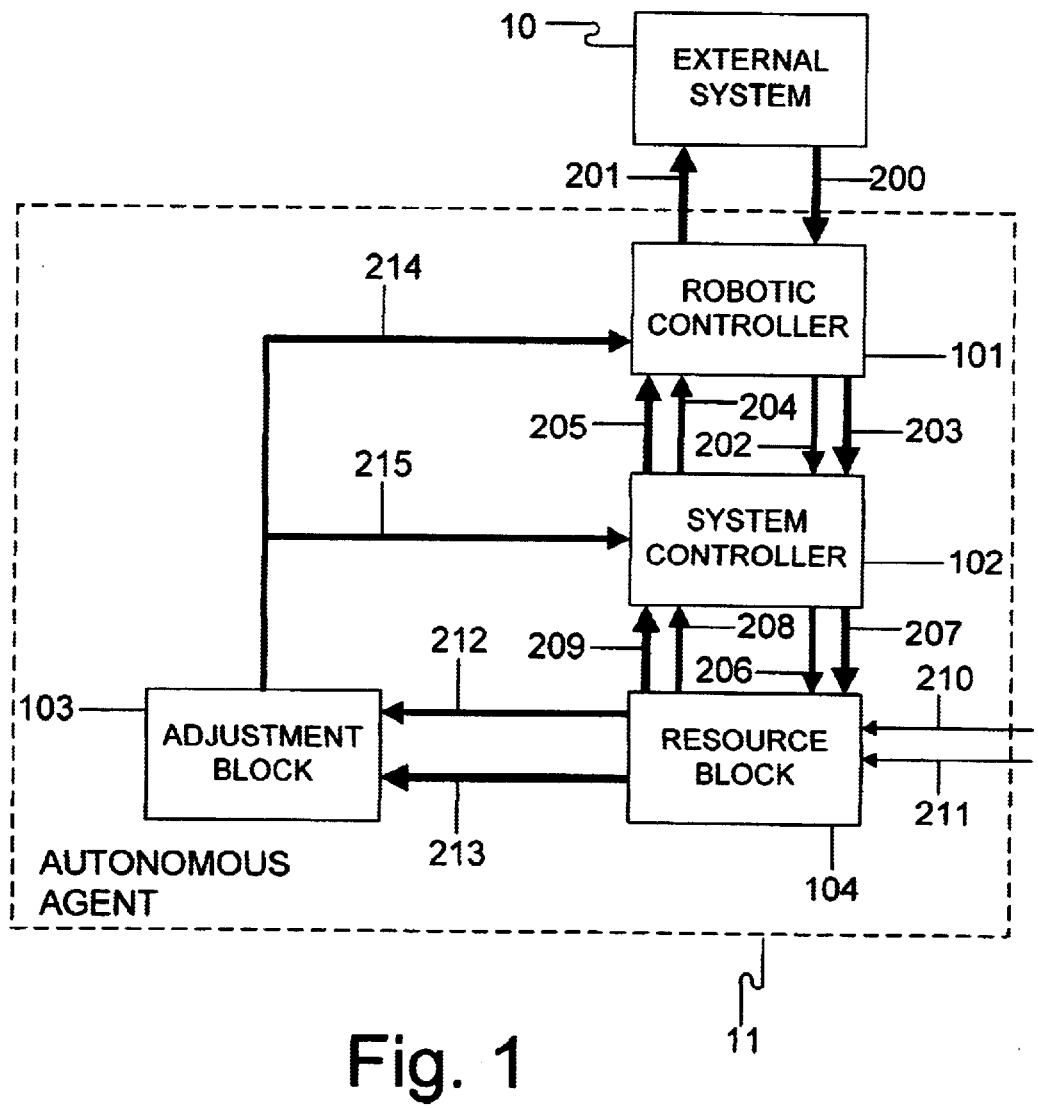
FIG. 1 is a block diagram of an Autonomous Agent using an auto-tuning algorithm on internal variables as a means of controlling its self-learning behavior.

The directive for learning by the Autonomous Agent 11 using the auto-tuning algorithm can be understood by reference to FIG. 1. In FIG. 1, signal line 212 are the error variables and represent error in the desired level of all resource variables. As the System Controller 102 attempts to "please" the trainer, it must utilize both the Resource Block 104 and the Robotic Controller 101. The error derivative variables, carried by signal line 213, are the derivative variables for the error variables on signal line 212. These error derivative variables carried by signal line 213 are also the derivative variables for all parameters that will be adjusted in the System Controller 102 and Robotic Controller 101 by the Adjustment Block 103. The effect of Adjustment Block 103 will be to reduce the level of the error variables carried on signal line 212. After the Adjustment Block 103 calculates an array of parameter change values, these values are sent over signal lines 214 and 215 to change the value of the parameters in the Robotic Controller 101 and System Controller 102. As the System Controller 102 interacts with Resource Block 104, it sends commands over signal line 206 and receives responses over signal line 208. Signal lines 207 and 209 represent the derivative variables for signal variables on signal lines 206 and 208, respectively.

As the System Controller 102 interacts with the Robotic Controller 101, it sends commands over signal line 204 and receives responses over signal line 202. Signal lines 205 and 203 represent the derivative variables for the signal variables on signal lines 204 and 202, respectively.

The learning or training algorithm used by the Adjustment Block 103 is preferably a reiterative algorithm using change variables. One preferred embodiment is briefly discussed in a later section. However, a complete discussion is found in the aforementioned co-pending patent application, "Method and Apparatus for Training of a State Machine."

The operator's control over the learning behavior of the Autonomous Agent 11 is by means of control of the level of the Reward/Punish Signal, received by the Resource Block 104 over signal line 210. The Reward/Punish Signal 210, is converted to an error variable by Resource Block 104 and sent to the Adjustment Block 103 where it is used to adjust the parameters in the System Controller 102 and Robotic Controller 101. Before the Adjustment Block 103 can adjust the parameters based on the error variable on signal line 212 derived from the Reward/Punish Signal 210, it must have associated with it an array of error derivative variables received via signal line 213. One of the objectives of the Resource Block 104 is to generate a signal that attempts to predict the value of the Reward/Punish Signal. To accomplish this, the Resource Block 104 attempts to train an internal State Machine Block 502 (FIG. 3) to predict the value of the Reward/Punish Signal.

Associated with the Reward/Punish Signal 210 is the On/Off Signal on line 211 that notifies the system when an operator is or is not actual controlling the level of the Reward/Punish Signal. A discussion of the use of the signal will be found in the discussion of the structure and operation of the Resource Block 104.

ROBOTIC CONTROLLER

Figure 2:
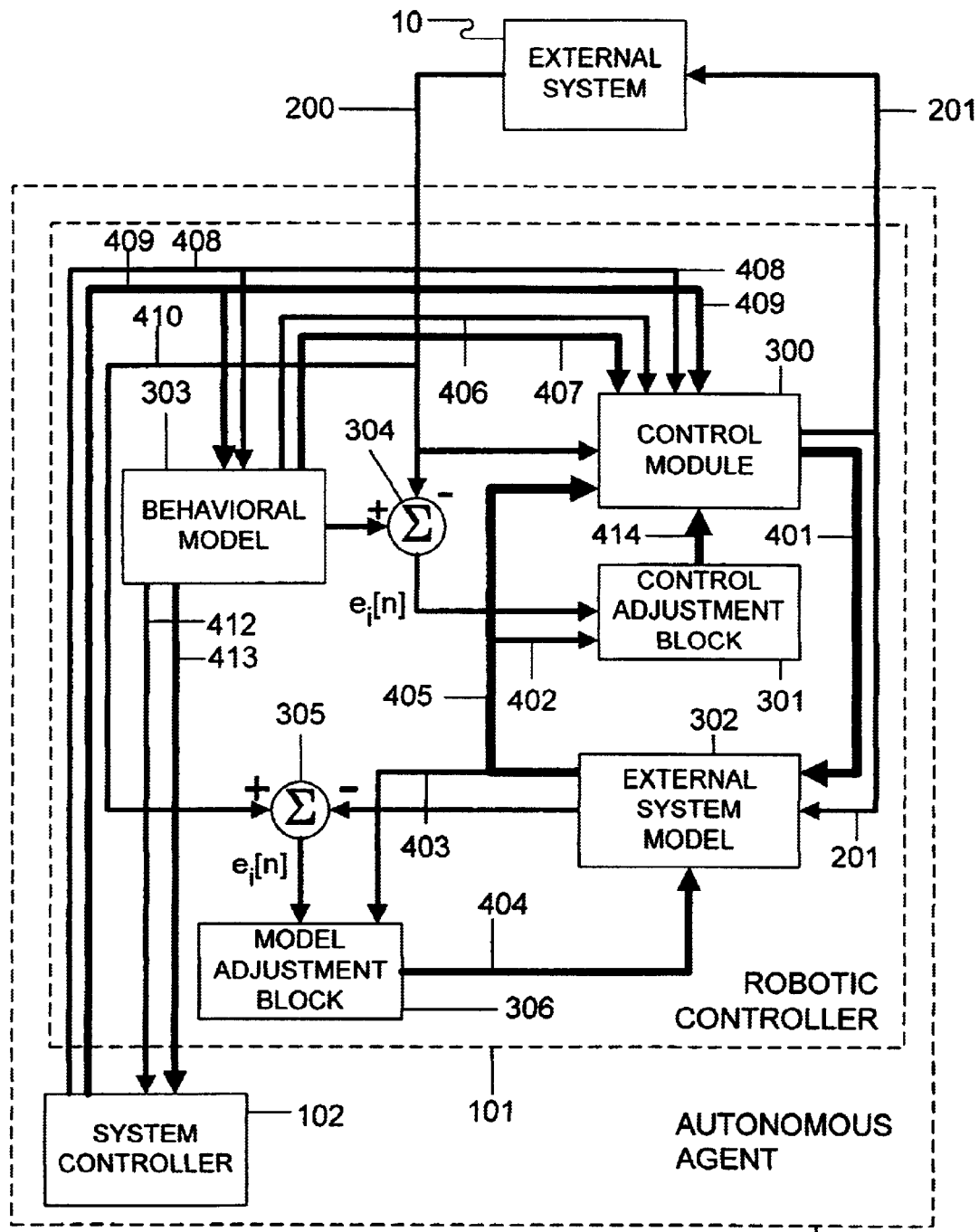
FIG. 2 is a block diagram of the Robotic Controller of in FIG. 1.

A block diagram of the Robotic Controller 101 is shown in FIG. 2. The Robotic Controller 101 contains five internal blocks or modules. The behavior of the Robotic Controller 101 is controlled by Control Module 300. A Behavior Model 303 is used as a model for training the Control Module 300. The Robotic Controller 101 is designed to work with the External System 10 to perform various actions that may be repetitive and complex. The best way to explain this statement is by example. Consider the action of walking or (for robotic fish) swimming. The action performed by the Robotic Controller 101 is controlled by the System Controller 102. As long as a Behavioral Switch (not shown) in the Behavioral Model 303 and a Control Module 300 within the Robotic Controller 101 are set for a given behavior, the Robotic Controller 101 will repetitively and periodically perform the desired activity. The behavior of Robotic Controller 101 can be modified based on external events. An example of this is the Robotic Controller directing the behavior of a humanoid like system. The Robotic Controller 101 could modify the controls, etc. so as to prevent the system from falling over. It could be trained to learn this corrections etc. by practice and actually falling over and learning from its mistakes.

The key by which the Robotic Controller 101 learns this adaptive task is the use of derivative variables. To develop the derivative variables it is necessary for an External System Model 302 to respond like the External System 10. The accomplish this, a Model Adjustment Block 306 adjusts the parameters within the External System Model 302 so that its behavior attempts to duplicate the behavior of the External System 10. To accomplish this, the Model Adjustment Block 306 uses an array of error variables obtained from a difference summer 305 and the derivative variables on signal line 403 obtained from the External System Model 302. Since the Control Module 300 responds interactively with the External System 10, it is necessary for the derivative variables for both the External System Model 302 and the Control Module 300 to loop through both the External System Model 302 and the Control Module 300 on unidirectional signal lines 405 and 401.

While the External System Model 302 is being trained, the Control Module 300 is also being trained. The training of the Control Module 300 is done by Control Adjustment Block 301. To accomplish this training, Control Adjustment Block 301 uses error variables from difference summer 304 and the derivative variables for the Control Module's parameters from the External System Model 302. The error variables from the difference summer 304 are generated by comparing the actual response of the External System 10 with the desired response generated by the Behavioral Model 303.

Not all parameters within the Robotic Controller 101 are adjusted by the Control Adjustment Blocks 301, and the Model Adjustment Block 306. Some parameters in the Behavioral Model 303 are adjusted by the Adjustment Block 103 in FIG. 1. These parameters are used to make minor adjustment to the output of the Behavioral Model or to coordinate the transition from one behavior of the Behavioral Model to another.

RESOURCE BLOCK

Figure 3:
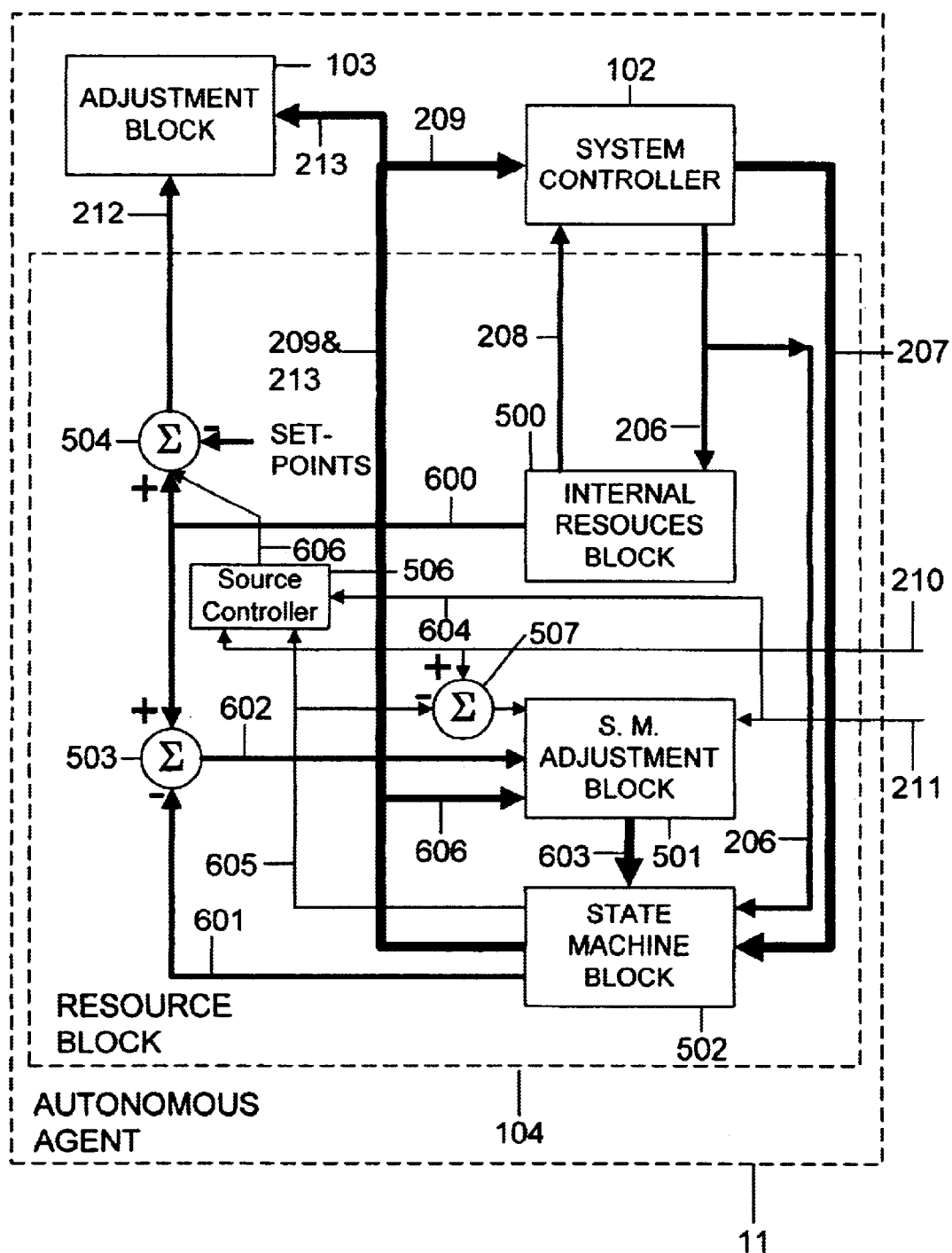
FIG. 3 is a block diagram of the Resource Block of FIG. 1.

A block diagram of the Resource Block 104 is shown in FIG. 3. Resource Block 104 contains three internal blocks or modules. The objectives of the Resource Block 104 is: 1) to generate resource variables that indicate their use of internal resources and that indicate the well being of the Autonomous Agent 11, and 2) to generate derivative variables of the resource variables. The derivative variables are for parameters in the System Controller 102 and the Robotic Controller 101 whose values are to be adjusted by Adjustment Block 103. To accomplish the task of generating the derivative variables for the resource variables, a State Machine Block 502 is trained to duplicate the behavior of the Internal Resource Block 500. The derivative variables for the variables sent from the System Controller 102 to the Internal Resource Block 500 are sent to the State Machine Block 502 over signal line 207. The State Machine Block 502 supplies derivative variables for the resource variables over signal line 213 to the Adjustment Block 103. The State Machine Block 502 also requires the input signals 206 from the System Controller 102 to the Internal Resource Block 500. The signal point in the State Machine Block 502 receiving the input of a particular signal from the System Controller 102 is also the signal point receiving all derivative variables over signal line 207 for this signal. The training of the State Machine Block 502 is done by S. M. Adjustment Block 501. To accomplish this training, the S. M. Adjustment Block 501 uses an array of error variables from the difference summer 503 and obtained by subtracting the resource variables produced by the Internal Resource Block 500 from the prediction of these values communicated via path 601 produced by the State Machine Block 502. The S. M. Adjustment Block 501 also uses some of the derivative variables for the resource variables produced by the State Machine Block 502. The derivative variables used are the derivative variables for the parameters in the State Machine Block 502 whose values are to be adjusted by S. M. Adjustment Block 501.

The difference summer 504 converts the resources variables produced by the Internal Resource Block to an array of error variables to be sent to the Adjustment Block 103. The derivative variables for these error variables are also required by the Adjustment Block 103 and are collected from the State Machine Block 502.

The Adjustment Block 103 is not expected to be able to reduce the value of all error variables to zero. This fact is in effect built into the system by the conflicting requirements. The relative gain of each of these error variables will influence the relative importance the Adjustment Block will attach to it. The weight placed on each error variable by Adjustment Block 103 will influence the relative laziness or aggression of the Autonomous Agent 11. This can be changed by modification of the training algorithm used by Adjustment Block 103. This modification of the training algorithm will adjust the relative important of each error variable, thereby adjusting the relative motivation of the Autonomous Agent 11. This modification of the training algorithm used by Adjustment Block 103 will be discussed in a separate section.

It is from this State Machine Block 502 that all the error derivative variables required by the Adjustment Block 103 are generated. In the previous statement the error derivative variables can also be called derivative variables of the resource variables.

As the Resource Block 104 gains experience in predicting the value of the Reward/Punish Signal 210, it no longer becomes necessary for the operator to direct the learning behavior of the system. It then becomes possible for the Autonomous Agent 11 to observe its own behavior and direct its own learning. To fully utilize this ability, it is necessary for the Reward/Punish Signal 210 to have associated with it an On/Off Signal 211. This On/Off Signal 211 turns off the training of the Reward/Punishment Prediction Signal 605 in the S. M. Adjustment Block 501. This On/Off Signal 211 also controls Reward/Punish Signal 606 sent to the differential summer 504. This control is done by Source Controller 506 controlled by On/Off Signal 211 via signal line 604. When the operator is no longer present or actively controlling the value of the Reward/Punish Signal 210 the Reward/Punish Prediction Signal 605 is not being trained and the Reward/Punish Signal used by Adjustment Block 103 is the Reward/Punish Prediction Signal 605. The error in the level of the Reward/Punish Prediction Signal 605 is supplied to S. M. Adjustment Block 501 from differential summer 507 which has as inputs the Reward/Punish Signal 210 and the Reward/Punish Prediction Signal 605.

DECISION BRANCH

A Decision Branch normally refers to a point in the program where the system makes a decision. A Decision Branch in the Autonomous Agent just described performs the same function but is designed so that each branch has its own multivariable power series. Each power series is supplied with all relevant information. To make a decision, the outputs of all the power series are evaluated and the branch chosen is the branch whose power series has the largest output. The Decision Branch in the System Controller 102 signals its choice to the Robotic Controller 101 by setting the chosen behavior bit on and all other behavioral bits off.

A remaining problem is training the Decision Branch. The end objective is to use the derivative variables for the resource variables and the errors in the level of resource variables. The first step in this process is to calculate the derivative variables for the parameters used in the power series of the Decision Branch. The definition of the value of a derivative is the ratio of the change in the value of a parameter to the change in the value of a output. The output of the branch that won the decision can be influenced by all parameters of all power series, because if it is a losing branch's power series, a large enough increase in its value could cause its branch to win and the winning branch to loss. Also if it is a parameter in the winning branch, a large enough change in its value could cause the winning branch to loss. A change in the value individual power series of a losing branch is not capable of influence the output of another losing branch. As a result then:

Winning branch→derivative variables for all power series.

Losing Branch→derivative variables for Winning Branch and itself.

The task now is how to calculate the value of these derivative variables.

Evaluating the Derivative Variables of a Decision Branch

To evaluate the value of the derivative variables of a Decision Branch, the following symbols will be used:

Value$_{win}$=value of winning branch's power series.

Value$_{it}$=value of this branch's power series.

Value$_2$=value of branch that was closest to winning but did not win (i.e. came in second place).

$\Delta\alpha_j$=change in value of parameter $\alpha_j$ that will cause a change of Decision Branch's output.

$\Delta$OUT=change in this Decision Branch's output due to change of decision.

ΔOUT=output of branch after switching minus present value of branch.

$$\frac{dOUT}{da_j} = \frac{\Delta OUT}{\Delta a_j} \quad (1)$$

Where $$\frac{dOUT}{da_j}$$

is the derivative variable for Decision Branch's output and a parameter in one of the power series in the Decision Branch. The change in the value of a power series can be determined from:

$$\text{change in value} = \Delta a_j \left(\frac{dout}{da_j}\right) \quad (2)$$

To cause a change in the output of the Decision Branch the change in value of a power series must be equal to the switch level. The switching level for the winning branch's power series is $\text{Value}_2 - \text{Value}_{win}$. For parameters in the winning branch, the switch value of parameter change is:

$$\Delta a_j = \frac{\text{Value}_2 - \text{Value}_{win}}{\frac{dout}{da_j}} \quad (3)$$

When the Decision Branch is switched, the change in output of the winning branch or ΔOUT is minus one. Using this result and the result of Equation (3) in Equation (1), the value of the derivative variable output for parameter in the winning branch is:

$$\frac{dOUT}{da_j} = \frac{\Delta OUT}{\Delta a_j} = (\text{Value}_{win} - \text{Value}_2)\left(\frac{dout}{da_j}\right) \quad (4)$$

By following a similar procedure, the derivative variable value for all other parameter on the winning branch are:

$$\frac{dOUT}{da_j} = \frac{\Delta OUT}{\Delta a_j} = (\text{Value}_{it} - \text{Value}_{win})\left(\frac{dout}{da_j}\right) \quad (5)$$

where $\text{Value}_{it}$ is the value of the power containing the parameter $\alpha_j$.

By following a similar procedure to determine the value of the derivative variables produced on a losing branch, for parameters in the losing branch's power series, the result is:

$$\frac{dOUT}{da_j} = (\text{Value}_{win} - \text{Value}_{it})\left(\frac{dout}{da_j}\right) \quad (6)$$

The change in the value of the parameters in the winning branch will only affect the output of a losing branch if this branch came in second place. For the branch that came in second place, the values of the derivative variables for parameters in the winning branch's power series are:

$$\frac{dOUT}{da_j} = (\text{Value}_2 - \text{Value}_{win})\left(\frac{dout}{da_j}\right) \quad (7)$$

A further remaining problem is how to use these derivative variables to train the Autonomous Agent 11.

Use of Derivative Variables of a Decision Branch

The end objective of course is that the derivative variables for the Decision Branch flow down to the resource variables and be adjusted as a result of the effort of the Autonomous Agent to minimize the error in the value of its resource variables. This will only occur if the Autonomous Agent has a concept of the effect of the action. For a robotic fish, etc., it is only capable of learning to swim in a given direction if it has a concept of location. This means that the External System Model must contain an Environmental Model. This model must contain the concept of location and the Autonomous Agent must be able to perceive that as it swims that it location is changing. Then by experimentation it would learn how to change its location. It could then learn to associate a given location with warmer water or absence of predators, etc. and as a result engage in organized activity to minimize the value of the array of error variables supplied to Adjustment Block 103 in FIG. 1.

Simulation as a Training Tool

The possibility exists that the information required to learn an outcome of contemplated behavior is in the Environmental Model within the External System Model 302 but still have the parameters within a Decision Branch set to improper values. What may be called "thinking about the outcome of contemplated behavior" is in reality conducting a simulation of the behavior with the Environmental Model. By running this simulation it is possible to extract information from the Environmental Model to adjust the parameters within a Decision Branch. It will not be necessary for the Autonomous Agent to get eaten by a predator in order to learn to avoid them.

Structure of State Machine Modules

The State Machine Modules in the Autonomous Agent 11 are the System Controller 102, the Controller Module 300, the External System Model 302, and the State Machine Block 502. All the State Machine Modules are built of the same components and are structured similarly. In developing an understanding of the State Machine Modules, it is helpful to remember that it is a mathematical construct or model that need not take physical form. The mathematical structure that may appear to be conceptual could also be rendered sufficiently concrete in its structure that it may represent a literal physical form. However, this model is used primarily to guide the organization of a computer program.

The State Machine Module's structure is built around a node. A node typically contains a multivariable power series and a Complex Impedance Network. The Complex Impedance Network will be linear filter element that can be modeled using electrical components or z-transforms. The parameters that are adjusted to train the State Machine Module are parameters in the power series or components in the Complex Impedance Network.

The nodes used in the State Machine Module can be broken down into two types. They are Lead-Type Nodes and Non-Lead-Type Nodes. This classification is dependent on the type of Complex Impedance Network used in the node. Nodes referred to as Lead-Type Nodes have a Lead-Type Network, while nodes referred to as Non-Lead-Type Nodes have Non-Lead-Type Networks. Lead-Type Networks are characterized by a rate of change of the output that is a function of the rate of change of the input. The rate of change of the output of a Non-Lead-Type Network is independent of the rate of change of the input. This classification of nodes is useful in defining the structure of the State Machine Modules. The structure of the State Machine Modules are layered structure of nodes having a top and a bottom. System inputs to the State Machine Modules are input to nodes at the top while system outputs from the State Machine Modules are taken from nodes at the bottom. The nodes in the structure receiving input from a position higher in the structure than itself can be both Lead-Type Nodes and Non-Lead-Type Nodes, while nodes receiving input from a position lower in the structure than itself are restricted to be Non-Lead-Type Nodes. This structure prevents the construction of loops of Lead-Type Nodes, which would unnecessarily increase the complexity of calculating the new values of the state variables within the State Machine Module during each processing cycle. In the State Machine Modules it is also desirable for a change in the inputs to pass through to the outputs in one processing cycle. To meet this requirement it is necessary that the nodes passing signals in the direction of the outputs be restricted to Lead-Type Nodes.

Figure 4A:
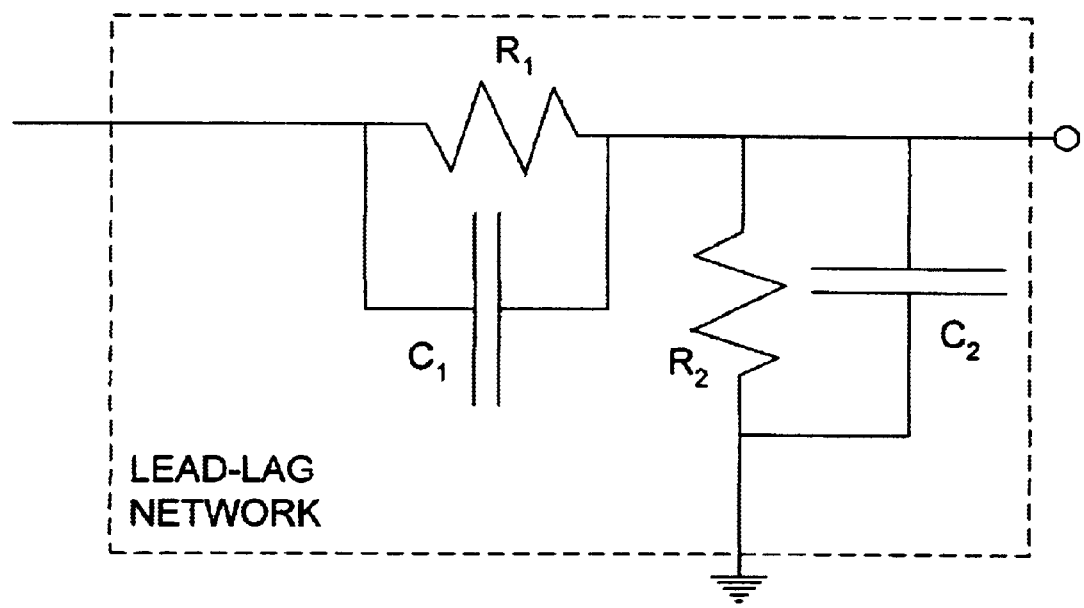
FIGS. 4a and 4b are Electrical Component Models of the Complex Impedance Networks used in the nodes that comprise the State Machine Blocks used in the Autonomous Agent.
Figure 4B:
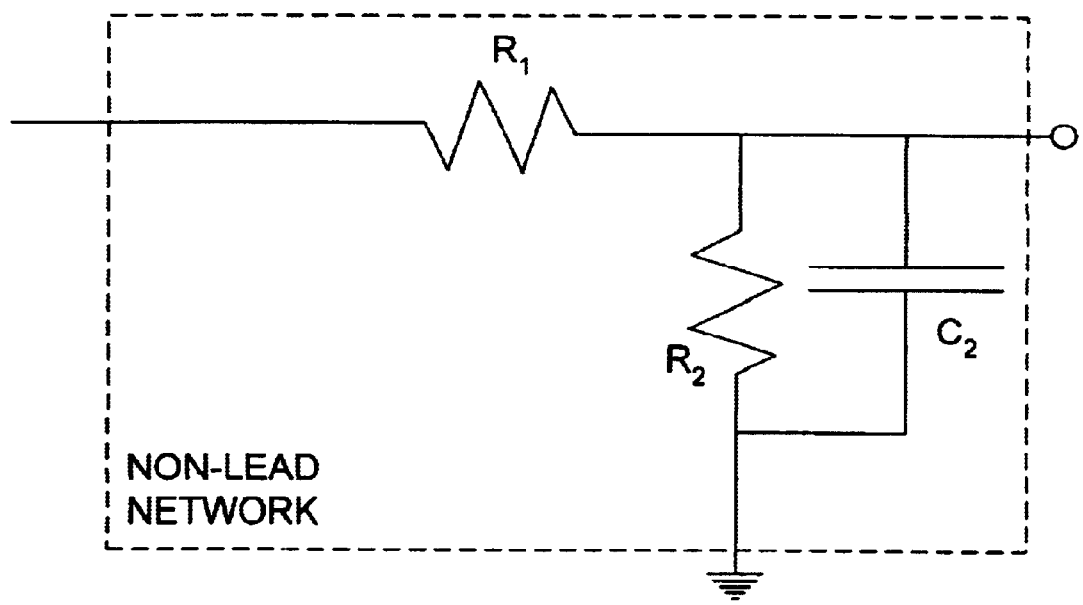

Examples of Electrical Component Models of Lead-Type Networks and Non-Lead-Type Networks are shown in FIGS. 4a and 4b respectively.

Processing Strategy

The processing strategy used depends on whether the Electrical Component Model or the Z-Transform Model is used to simulate the Complex Impedance Network component of the nodes. If the Electrical Component Model is used, each VarType structure representing all the normal variables in the network of nodes used in the State Machine Block will have associated with it another VarType structure representing the rate of change of the normal variable. (A VarType structure contains floating point variables representing the value of the level signal and values of an array of associated derivative variables.) The first step in the processing cycle is to calculate the value of the time derivative VarType structures. The second step is then to use the rate of change values and the old value to calculate a set of new values. The new value of a variable can be calculated using:

$$e_o[n+1] = e_o[n] + \Delta t \left( \frac{d e_o[n]}{dt} \right), \quad (8)$$

where e is a variable. In Equation (8), the value of $e_o[n+1]$ and $e_o[n]$ are the level signal VarType structures, while $$\frac{d e_o[n]}{dt}$$

is the value of time derivative VarType structure.

This is what is commonly referred to as the rectangular approximation or integration technique. There are good reasons for using this integration technique. A change in the input must be able to affect the output after one processing cycle. This can only be done if the rectangular integration technique is used and a forward difference technique is used to calculate the rate of change of the system inputs. The system inputs are the inputs to the State Machine Block. The forward difference technique for calculating the rate of change of a system input is obtained by using the following equation:

$$\frac{d(\text{input}[n])}{dt} = \frac{\text{input}[n+1] - \text{input}[n]}{\Delta t} \quad (9)$$

The initial conditions will only be assigned to the normal variable VarType structure. The processing sequence of processing of nodes within a processing cycle will be all Non-Lead-Type Nodes then in the proper sequence, all Lead-Type Nodes. The processing of all nodes will yield an array of VarType structure defining the rate of change of all normal variables VarType structures. Then new values of all normal variable VarType structures are calculated using the array of VarType structures defining the rate of change and the existing array of normal variable VarType structures.

Training the State Machine Modules

The State Machine Modules within the Autonomous Agent are the System Controller 102 and within the Robotic Controller 100, the Control Module 300 and the External System Model 302 and within the Resource Block 104, the State Machine Block 502. Each of the Adjustment Blocks responsible for training these State Machine Modules may use the preferred algorithm discussed in this section.

The algorithm used for training each of these State Machine Modules uses an algorithm that is discussed more completely in aforementioned pending patent application Ser. No. 09/693,003 filed Oct. 20, 2000 in the name of the present inventor, entitled "Method and Apparatus for Training a State Machine," which is incorporated herein by reference. The first step in this process is to collect training data. To simplify the discussion, the method used by Control Adjustment Block 301 shown in FIG. 2 will be discussed herein in some detail. It is left to those of ordinary skill in the art to apply this description to determine the precise method used by other Adjustment Modules. The Behavioral Model 303 is used to tell the Control Module 300 the desired response. Because of the recursive nature of the system, the updating of parameter values reduces the accuracy of the derivative variables. To reduce this disturbance, the information from a number of data points collected before the information from all the data points is used jointly to calculate one change of parameter values. Each data point consists of an instantaneous sample of the error variable and all appropriate derivative variables. Typically a data point is collected each processing cycle during a training interval. At the end of the training interval, the data point information is used jointly for calculating an array of parameter change values. The values of the parameters in the system are changed by addition of the values of the array of parameter change values to the corresponding appropriate parameters. After the parameter values have been updated, the system waits for each of the derivative variables to converge to a value which is the value of the true derivative variable before another training interval is started. This procedure is shown in the flow diagram of FIG. 5.

Figure 5:
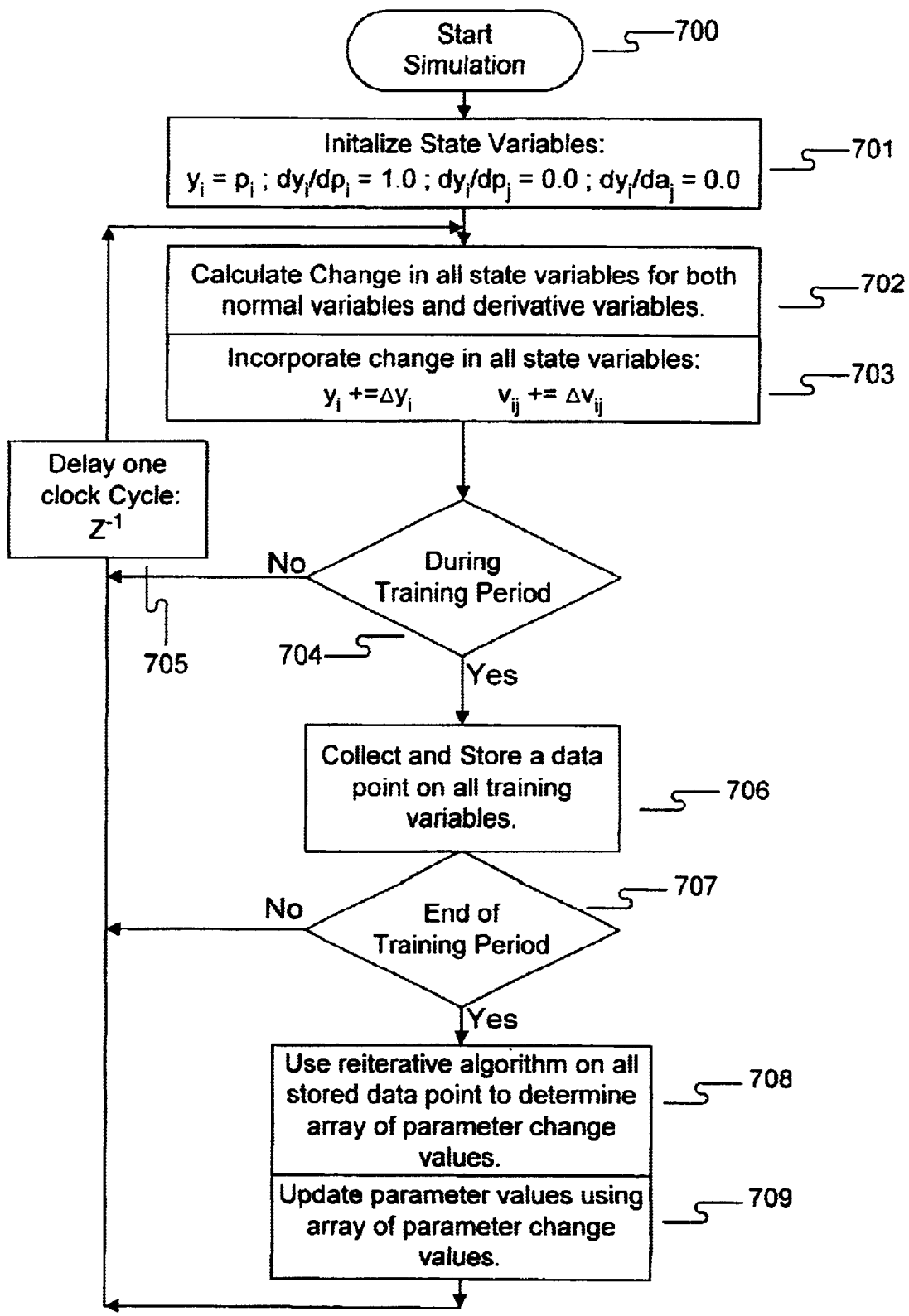
FIG. 5 is a flow chart of the processing and training of the State Machine Blocks in the Autonomous Agent.

In FIG. 5, Step 701 is used to establish the initial conditions to start the simulation. Steps 702, 703, 704 and 705 are used to process the state equations or nodes of the State Machine Modules in order to determine the new state based on the state equations and the present value of the normal variables. Decision Step 704 determines if a data point should be collected in Step 706 during this processing cycle. If a number of normal variables is being trained at the same time, each time data point information is collected, a data point is collected for each normal variable being trained. At the end of the training interval and after the last data point has been collected, Control Step 707 determines if the data point information should be used to calculate an array of parameter change values. In Step 708, the array of parameter change values is calculated using an iterative algorithm with change variables. There will be a change variable for each normal variable being trained. After the array of parameter change values has been calculated, the values of the parameters are changed in Step 709 by addition of the appropriate values of the array of parameter change values. FIG. 5 does not explicitly show a wait period after the value of the parameters is updated, but this information is incorporated into the decision by Control Step 704 in determining when to start a training interval.

The algorithm used in Step 708 will now be explained. This algorithm uses a change variable to determine the array of parameter adjustment values. The objective of the training procedure is to adjust the values in the array of parameter change values to make the change variable equal to the error variable. The change variable is a prediction of the change in the normal variable when the array of parameter change values is incorporated. There will be a change variable for each normal variable being trained. The value of the change variable will only be defined at the data points collected, and its value can be calculated using:

$$\text{change}_i \big|_n = \sum_{j=0}^{J} \left( \frac{dy_i}{da_j} \bigg|_n \right) \Delta a_j. \tag{10}$$

In Equation (10) the value calculated is the value shown as change$_i|_n$ is the change variable for training variable $y_i$ at data point n. Also in Equation (10), the values $\Delta\alpha_j$ is the $j^{th}$ value from the array of parameter adjust values, and $$\frac{dy_i}{da_j}\bigg|_n$$

is the value of the derivative variable for normal variable $y_i$, and parameter $\alpha_j$, collected at data point n. When the second order derivative variables is used, the value of the change variable can be calculated using:

$$\text{change}_i \big|_n = \sum_{j=0}^{J} \left( \frac{dy_i}{da_j} \bigg|_n \right) \Delta a_j + \tag{11}$$

$$\sum_{j,k=0}^{J,K} \left( \frac{d^2 y_i}{da_j da_k} \bigg|_n \right) \Delta a_j \Delta a_k + \frac{1}{2} \sum_{j=0}^{J} \left( \frac{d^2 y_i}{d^2 a_j} \bigg|_n \right) (\Delta a_j)^2.$$

To adjust the values in the array of parameter change values, $\Delta\alpha_j$, the Training Error is defined. The Training Error is defined as the difference between the error variable and the change variable.

$$\text{Training Error}_i\big|_n = \text{error}_i\big|_n - \text{change}_i\big|_n. \tag{12}$$

The Training Error is used to adjust the individual values in the array of parameter change values according to the following equation:

$$\Delta a_j\big|_{new} = \Delta a_j\big|_{old} + K \frac{\text{Training Error}_i\big|_n}{\text{Beta}_i\big|_n} \left( \frac{d\text{change}_i}{d\Delta a_j} \bigg|_n \right) \tag{13}$$

where:

$$\text{Beta}_i\big|_n = \sum_{j=0}^{J} \left( \frac{d\text{change}_i}{d\Delta a_j} \bigg|_n \right)^2. \tag{14}$$

If Equation (10) is used instead of Equation (11), $$\frac{d\text{change}_i}{d\Delta a_j}\bigg|_n \quad \text{reduces to} \quad \frac{dy_i}{da_j}\bigg|_n.$$

The value of K in Equation (13) is chosen as a compromise between a good rate of convergence and the need to have the array of change parameters to stabilize to constant values when the training error at all data points can not be completely eliminated. The value of K will usually be less than but very close to one.

This process is repeated on all data points collected during the training interval until the change variable approximates the error variable. This process constitutes the reiterative algorithm of Step 708.

After the array of parameter change values has been determined, the parameter values are changed by addition of the corresponding value of the array of parameter change values according to the follow equation:

$$\alpha_j\big|_{new} = \alpha_j\big|_{old} + \Delta\alpha_j \tag{15}$$

The procedure used in Step 709 of FIG. 5 can be summarized as repeated application of Equation (15).

Need and Techniques for Adjusting Values of Derivative Variables

The technique used to calculate the change of a parameter from a data point causes the change in value of a parameter to be proportional to the value of this parameter's derivative variable. Even when using the reiterative algorithm with a change variable, the determination of which parameter receives most of the adjustment is distorted by the relative value of the derivative variables. There are two techniques that can be used to distort this normal distribution to a distribution that will be more effective in learning the task. One technique is to change the relative values of the derivative variables as they are generated. The second technique is to change the relative values of the derivative variables as sort of a preprocessing step before the derivative variables are used by the training algorithm. Both techniques involve classifying the derivative variables according to type of parameter used in their generation or type of parameter they are used to control. The ideal solution is for the average values of all the derivative variable types be to equal. Techniques for doing so have been described elsewhere. For a complete discussion, see the patent application "Structure of a Trainable State Machine," Ser. No. 09/708,902 filed Nov. 7, 2000, and incorporated herein by reference.

Modification of Training Algorithm Used by Adjustment Block 103

The training algorithm normally attempts to completely eliminate the training error at each data point. Because of the inherent conflict built into the system by the definition of the resource variables, the error in the level of all resource variables cannot be eliminated. To permit the array of parameter adjustment values to arrive at a set of stable values, it is necessary to not try to completely eliminate the training error at each data point. Otherwise the array of parameter adjustment values would vary widely and depend on the source of the last data point used.

In Equation (13) a parameter K is used to permit the array of parameter change values to arrive at stable values when the training error at all data points cannot be completely eliminated. The modification of the algorithm used by Adjustment Block 103 is to have the value of K vary as a function of the source of the data point. There will be a different value of K for each resource variable. If the source of the data point presently being used is the error variable for resource variable number one, the value of K used will be unique for this resource variable. The resource variable with a value of K closest to one will be the resource variable that the modified algorithm will work hardest on to eliminate the error. The modified algorithm's tolerance in the error of each of the resource variables will be proportional to difference between one and the respective K variables.

Errors in Design

A design is by its nature incomplete because it is not possible to contemplate all likely problems. In the foregoing description under the heading "Use of Derivative Variables of a Decision Branch," it was suggested that the External System Model contain an Environmental Model and that this be used by the System Controller in the training of Decision Branches. A more careful analysis of the figures shows that the External System Model 302 is in the Robotic Controller 101 and not available to the System Controller 102. A solution to this problem is to give the System Controller 102 its own External System Model and call it the Environmental Model. This causes the Environmental Model to have its own Adjustment Block and causes the structure of the Autonomous Agent shown in FIG. 1 to look like the Robotic Controller shown in FIG. 2. An alternate approach is to shift some of the decisions made by the System Controller 102 down in the hierarchy to the Control Module 300 in the Robotic Controller 102.

Practical Applications

The objective of the present application is to disclose a system capable of self-motivated learning and how to design such a system. The system according to the invention is not only capable of learning but of determining the types of information it should acquire. All systems of which the present inventor is aware must have others direct its learning activity. The system according to the invention comprising an Autonomous Agent is not only capable of learning but of not learning information not relevant to its objective.

The invention has been explained with respect to specific embodiments. Other embodiments will be evident to those of ordinary skill in the art. It is therefore not intended that this invention be limited, except as indicated by the appended claims.

What is claimed is:

1. In an autonomous agent, a method for controlling self learning behavior of said autonomous agent comprising:

using resource variables for monitoring level of use of internal resources and condition of said autonomous agent;

generating error variables of said resource variables, said error variables representing differences in value of desired values of said resource variables and actual values of said resource variables;

generating resource derivative variables of said resource variables, each of said resource derivative variables representing the derivative of a single resource variable with a single parameter in said autonomous agent, wherein each said single parameter used in said resource derivative variables controls behavior of said autonomous agent, and using said error variables and said resource derivative variables to adjust parameters in said autonomous agent to control behavior of said autonomous agent.

2. The method of claim 1 wherein the step of generating said resource derivative variables includes using a State Machine Block, said State Machine Block being trained to model sources of said resource variables.

3. The method of claim 2 wherein said State Machine Block is trained by the use of error variables resulting from a comparison of outputs of said State Machine Block with outputs of said source of resource variables, and by use of derivative variables of outputs of said State Machine Block with parameters in said State Machine Block.

4. The method of claim 1 wherein the step of using said error variables and said resource derivative variables involves use of change variables, wherein a change variable is provided for each said resource variable and the value of said change variable is calculated using:

$$\text{change}_i |_n = \sum_{j=0}^{J} \left( \frac{dy_i}{da_j} \bigg|_n \right) \Delta a_j$$

where:

$\text{change}_i|_n$ is the value of the change variable for the $y_i$ resource variable at the $n^{th}$ data point;

$$\frac{dy_i}{da_j}\bigg|_n$$

is the $n^{th}$ data point value of the resource derivative variable for resource variable $y_i$ and parameter $a_j$;

$\Delta a_j$ the $j^{th}$ value of the array of parameter change values; wherein said parameter change values are adjusted according to the equation:

$$\Delta a_j|_{new} = \Delta a_j|_{old} + K \frac{\text{Training Error}_i|_n}{\text{Beta}_i|_n} \left( \frac{dy_i}{da_j} \bigg|_n \right)$$

where:

Training $\text{Error}_i|_n$ is $n^{th}$ data point value of the training error, the value of said training error being determined from:

Training $\text{Error}_i|_n = \text{error}_i|_n - \text{change}_i|_n$;

the value of $\text{Beta}_i|_n$ is calculated using:

$$\text{Beta}_i|_n = \sum_{j=0}^{J} \left( \frac{dy_i}{da_j}\bigg|_n \right)^2 ; \text{ and}$$

K is a value very close to but less than one.

5. The method of claim 4 wherein K is a variable having a different value for each resource variable being trained.

* * * * *